United States Patent
Drane (10) Patent No.: US 10,119,648 B2
(45) Date of Patent: Nov. 6, 2018

(54) CONDUIT SLEEVE WITH DETACHABLE END CAP

(71) Applicant: Thomas & Betts International, LLC, Wilmington, DE (US)

(72) Inventor: Mark R. Drane, Germantown, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 239 days.

(21) Appl. No.: 14/710,765

(22) Filed: May 13, 2015

(65) Prior Publication Data

US 2015/0330549 A1 Nov. 19, 2015

Related U.S. Application Data

(60) Provisional application No. 61/992,747, filed on May 13, 2014.

(51) Int. Cl.
  *B65D 59/06* (2006.01)
  *F16L 57/00* (2006.01)
  *F16L 55/115* (2006.01)

(52) U.S. Cl.
  CPC ............ *F16L 57/005* (2013.01); *F16L 55/115* (2013.01)

(58) Field of Classification Search
  CPC .............................. F16L 55/115; F16L 57/005
  USPC ............................. 138/89, 90, 92, 96 R, 96 T
  See application file for complete search history.

(56) References Cited

U.S. PATENT DOCUMENTS

| 1,165,427 | A |   | 12/1915 | McILroy |
| 1,692,710 | A | * | 11/1928 | Spahn ...................... H02G 3/06 |
|           |   |   |         | 138/96 T |
| 1,708,657 | A | * | 4/1929  | Brown ................... B65D 59/02 |
|           |   |   |         | 102/528 |
| 3,000,402 | A | * | 9/1961  | Bowman, Jr. .......... B65D 59/00 |
|           |   |   |         | 138/96 T |
| 4,185,665 | A |   | 1/1980  | Flimon |
| 4,228,823 | A | * | 10/1980 | Zepeda ................. F16L 35/005 |
|           |   |   |         | 138/109 |
| 5,452,749 | A | * | 9/1995  | Johnson ................. B65D 59/06 |
|           |   |   |         | 138/89 |

(Continued)

*Primary Examiner* — Vishal Pancholi
(74) *Attorney, Agent, or Firm* — Taft Stettinius & Hollister LLP (57) ABSTRACT

The disclosed invention provides a conduit sleeve with detachable end cap that greatly reduces the complexity of the current system that requires a multiplicity of integral sleeve conduit bodies, styles, fixtures, fittings, connectors, rigid conduits with female threading, and other receiving structures. Now, one conduit sleeve with detachable end cap can be used to protect a threaded conduit end without the need for specialty receiving structures having an integral sleeve. This is accomplished by having a single object performing both roles as conduit sleeve and end cap. The end cap portion can simply be cut or twisted off from the conduit sleeve portion at a convenient time after installation onto a rigid conduit, tube, pipe, or similar structure. The remaining conduit sleeve that is left protects the area of the rigid conduit where conduit threads would have been left exposed since they are not fully threaded into the receiving structure. In addition, the conduit sleeve may be flexible in construction, which is desirable if the rigid conduit is bent, such as along a transition area of a wall.

18 Claims, 6 Drawing Sheets

(56) References Cited

U.S. PATENT DOCUMENTS

| | | | | |
|---|---|---|---|---|
| 5,899,234 A * | 5/1999 | Senninger | ............ | F16L 55/1152 |
| | | | | 138/89 |
| 2010/0089484 A1* | 4/2010 | Courtois | ............... | F16L 57/005 |
| | | | | 138/96 T |
| 2010/0326560 A1* | 12/2010 | Zeyfang | ................. | B65D 59/06 |
| | | | | 138/96 T |
| 2012/0024415 A1* | 2/2012 | Molloy | .............. | F01M 11/0408 |
| | | | | 138/96 R |
| 2012/0152395 A1* | 6/2012 | Seidel | ............... | B29C 45/14598 |
| | | | | 138/103 |
| 2012/0227854 A1* | 9/2012 | Zeyfang | ................ | F16L 57/005 |
| | | | | 138/96 T |

\* cited by examiner

CONDUIT SLEEVE WITH DETACHABLE END CAP

CROSS-REFERENCES TO RELATED APPLICATIONS

This application claims the benefit of U.S. Provisional Application No. 61/992,747 filed May 13, 2014, which is incorporated herein by reference in its entirety.

FIELD OF THE INVENTION

The present invention is generally directed toward conduit sleeve devices, and, in particular, to a conduit sleeve device having a detachable end cap for protecting the end of a conduit or other tubular structure.

BACKGROUND OF THE INVENTION

When threaded conduit is shipped, the ends must be protected from damage to the threads and/or to prevent debris from entering the conduit tube. Protection is likewise needed in storage and job sites. To accomplish this, separate PVC or plastic polymer end caps are used to protect the threads and cover the conduit tube end openings. The end caps are subsequently detached and discarded by an installer at the job site.

When the threaded conduit is coated in PVC or another corrosion prevention material, it is imperative that the threads are not exposed between a conduit body, fitting, connector, or other receiving structure and the threaded conduit once installed because the threads are uncoated and easily susceptible to corrosion. To accomplish this, integral sleeves molded to the receiving structures are sometimes used. The integral sleeves, however, are difficult to mold properly with desired thickness and uniformity due to the employed "dipping" mold process. It is also difficult to maintain proper size/roundness of the integral sleeves, especially when shipped in at job sites. Further, additional friction impedes installation as the threaded conduit rubs on the interior surface of the integral sleeves during threading into place.

SUMMARY OF THE INVENTION

The present invention overcomes the above-mentioned disadvantages by providing a conduit sleeve with detachable end cap that greatly reduces the complexity of the current system that requires a multiplicity of integral sleeve conduit bodies, styles, fittings, connectors, and other receiving structures. Now, one conduit sleeve with detachable end cap can be used to protect a threaded conduit without the need for receiving structures having an integral sleeve.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The disclosed invention overcomes all of the disadvantages of the known conduit sleeves and known end caps by providing a conduit sleeve with detachable end cap 1 that greatly reduces the complexity of the current system that requires a multiplicity of integral sleeve conduit bodies, styles, fixtures, fittings, connectors, rigid conduits with female threading, and other receiving structures 50. Now, one conduit sleeve with detachable end cap 1 can be used to protect a threaded conduit end 48 without the need for specialty receiving structures having an integral sleeve. This is accomplished by having a single object performing both roles as conduit sleeve 20 and end cap 30. At the installation site, an installer can simply cut or twist off the end cap portion 3 from the conduit sleeve portion 2 at a convenient time after installation of the conduit sleeve with detachable end cap 1 onto a rigid conduit, tube, pipe, or similar structure ("rigid conduit" for brevity) 40. The remaining conduit sleeve 20 that is left protects the area of the rigid conduit 40 where conduit threads 43 would have been exposed since they are not fully screwed into the receiving structure 50. This is accomplished, in part, by the conduit sleeve 20 having an internal conduit sleeve thread cover void 25 that covers a portion of threads (remaining covered threads 47) of the rigid conduit 40 after the end cap 30 is detached. In addition, the conduit sleeve may be flexible in construction, which is desirable if the rigid conduit 40 is bent, such as along a transition area of a wall.

Referring now to the drawings, FIGS. 1A-1E illustrate an exemplary embodiment of the conduit sleeve with detachable end cap 1. The conduit sleeve with detachable end cap 1 includes a conduit sleeve portion 2 and an end cap portion 3. The conduit sleeve portion 2 is to be installed over the end a rigid conduit 40, discussed further below. Also discussed further below, the end cap portion 3 is designed such that an end cap 30 is capable of being twisted or cut away from the conduit sleeve with detachable end cap 1, resulting in conduit sleeve 20 remaining over the rigid conduit 40. At the junction of the conduit sleeve portion 2 and the end cap portion 3, there is an annular recess element 4. The conduit sleeve portion 2 includes the conduit port end 6 with conduit port 23 through which a rigid conduit 40 may be inserted. The conduit sleeve portion 2 has a conduit sleeve exterior surface 21 and an interior surface 22. The end cap portion 3 includes an end cap exterior surface 31 and an interior surface 32. The end cap portion 3 also has an end cap end 7 with end cap face surface 34 and end cap window 33. The end cap window 33 provides a window to inspect the interior of the rigid conduit without prematurely removing the end cap 30, a portion to grip when breaking the end cap 30 away, and to prevent a vacuum from forming when removing the end cap 30, which might make detachment more difficult. Disposed on the end cap exterior surface 31 and end cap face surface 34 along a line extending from end cap window 33 to annular recess element 4 is an end cap recess element 5.

Figure 1A:
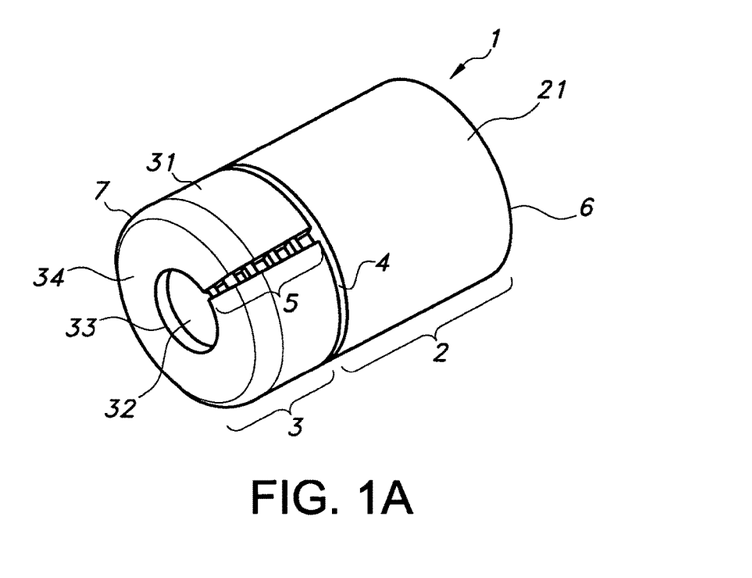
FIG. 1A is a perspective view of an exemplary embodiment of a conduit sleeve with detachable end cap.
Figure 1B:
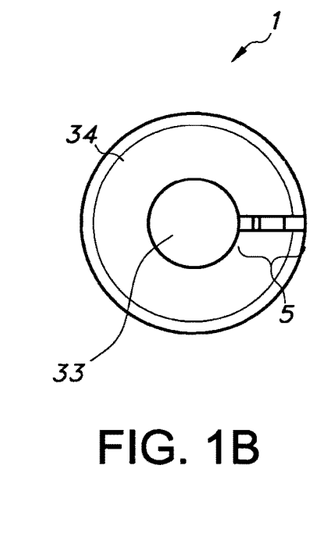
FIG. 1B is a front elevation view of a conduit sleeve with detachable end cap.
Figure 1C:
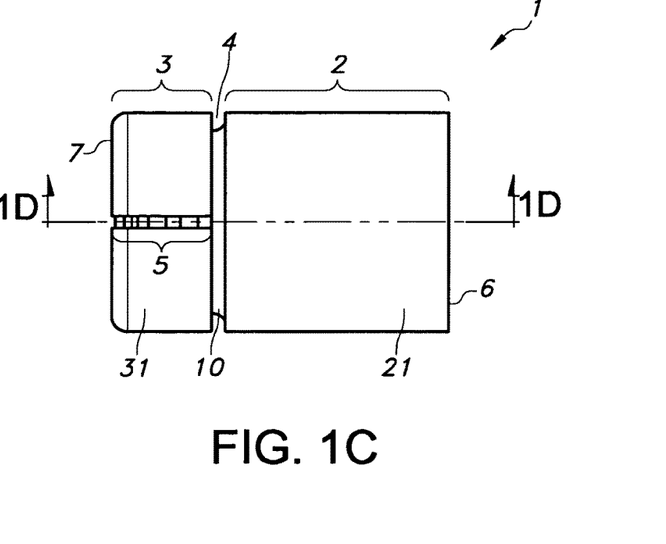
FIG. 1C is a side elevation view of a conduit sleeve with detachable end cap showing the cap recess and annular recess elements.
Figure 1D:
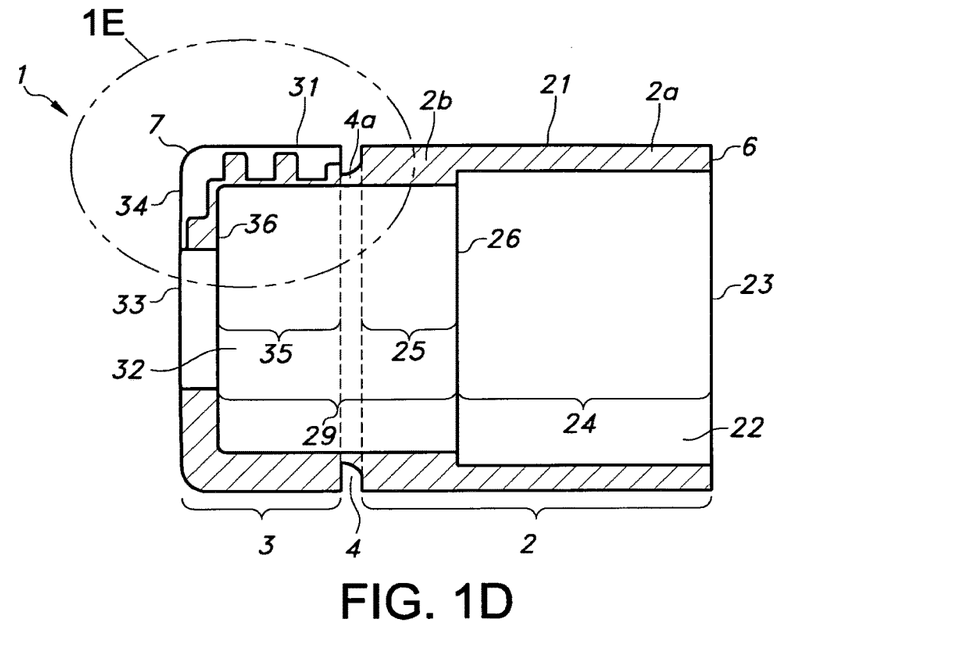
FIG. 1D is a cross-sectional view of the conduit sleeve with detachable end cap shown in FIG. 1C along LINE A-A in the cap recess element.

As can be appreciated in FIG. 1D, a cross-sectional view of the conduit sleeve with detachable end cap 1 shown in FIG. 1C cut along LINE A-A and running through the cap recess element 5, annular recess element 4 creates a thinning of the annular recess wall 4a between the exterior 21 and interior surfaces 22 of the conduit sleeve portion 2. Annular recess element 4 is disposed around the outer periphery surface 21 of the junction of the conduit sleeve portion 2 and the end cap portion 3. Thus, the thinning of the annular recess wall 4a is also peripherally disposed around the junction of the conduit sleeve portion 2 and the end cap portion 3. Preferably, the thinning of the annular recess wall 4a occurs on the exterior surface 21 of the annular recess element 4 forming an annular sealing surface 10. This exterior thinning of annular recess wall 4a allows for the interior surface 22 positioned below annular recess wall 4a to be in contact with and thereby supported by the conduit threads 43 of an inserted rigid conduit 40 when detaching end cap portion 3.

Conduit port 23 is located at the conduit port end 6 of conduit sleeve with detachable end cap 1. Conduit port 23 provides entry into a conduit void 24 within conduit sleeve portion 2, wherein the end 44 of a rigid conduit 40 may be inserted for protection during shipping, storage, or at a job site. Conduit void 24 is in communication with thread cover void 29 and separated by an internal shoulder (conduit end stopper 26). Conduit end stopper 26 forms an internal annular shoulder of the interior surface 22 within conduit sleeve portion 2, which thereby divides the interior void of the conduit sleeve with detachable end cap 1 into portions having different internal dimensions $d_1$ and $d_2$. Thread cover void 29 is within the end cap portion 3 and a portion of conduit sleeve portion 2 from the conduit end stopper 26 to the end cap junction 11. The threaded conduit end 44 may be further inserted into the thread cover void 29 for protection during shipping, storage, or at a job site. Thread cover void 29 is comprised of conduit sleeve thread cover void 25 (that portion of conduit sleeve portion 2 from the conduit end stopper 26 to the end cap junction 11) and conduit thread protection void 35 (the interior void within end cap portion 3). Conduit thread protection void 35 is configured to expose a portion of conduit threads 46 of the rigid conduit 40 after the end cap portion 3 is detached.

Figure 1E:
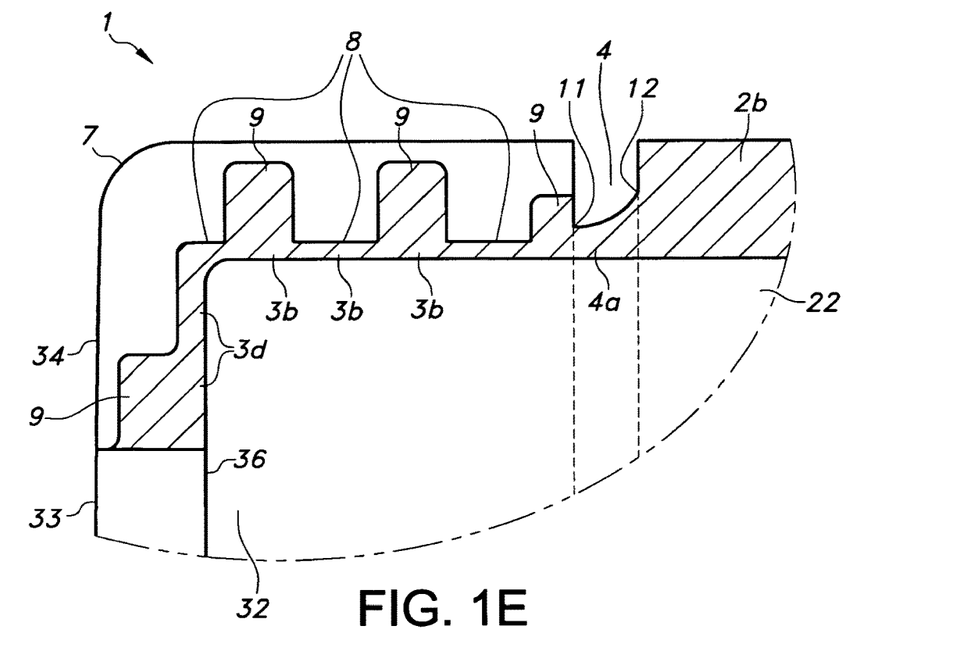
FIG. 1E is a detail enlargement of DETAIL A region of the conduit sleeve with detachable end cap shown in FIG. 1D showing the thinned recesses of the cap recess element and the thinned beveled or curved shape of the annular recess element.

Now referring to FIG. 1E, it can be appreciated that annular sealing surface 10 preferably has a beveled (sloped or curved) shape with a thinner dimension of annular recess wall 4a at end cap portion junction 11 than at conduit sleeve junction point 12. As will be discussed further below, the beveled shape of annular sealing surface 10 allows for a tight seal between conduit sleeve 20 and a receiving structure connector edge 55 when the associated rigid conduit 40 is coupled with the receiving structure opening 54 (see, e.g., FIG. 5B). The cross-sectional view also shows that end cap recess element 5 creates a thinning of end cap axial wall 3a (thinned axial wall 3b) and end cap end wall 3c (thinned end wall 3d) between the exterior 31 and interior surfaces 32 of the end cap portion 2. The end cap recess element 5 is disposed on the end cap exterior surface 31 in a line extending from annular recess element 4 to end cap window 33 on the end cap end face 34. Preferably, end cap recess element 5 is configured to have alternating thinned recess elements 8 and structural rib elements 9, thereby creating an alternating raised and lowered profile as shown in FIGS. 1D and 1E.

Figure 2A:
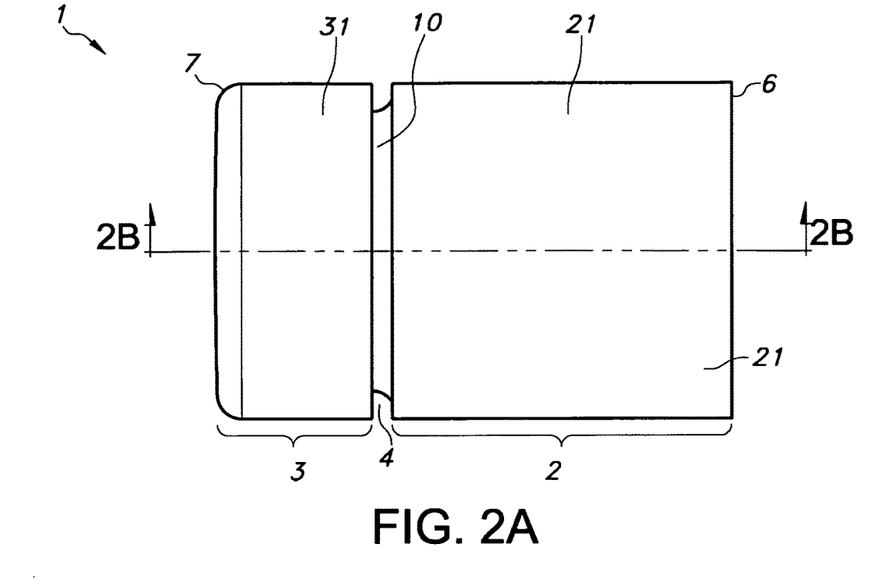
FIG. 2A is a side elevation view of a conduit sleeve with detachable end cap rotated such that the cap recess element is not in view.
Figure 2B:
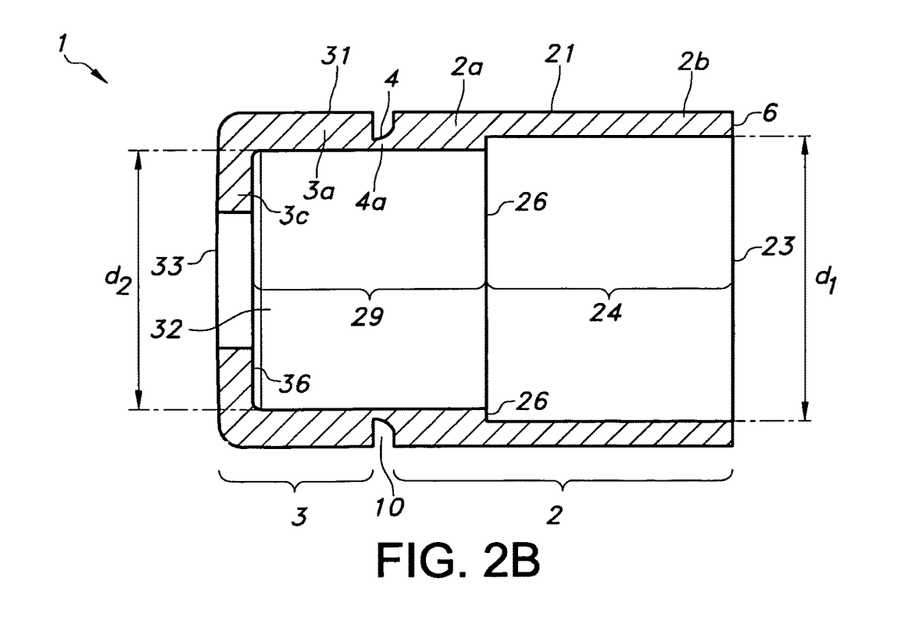
FIG. 2B is a cross-sectional view of the conduit sleeve with detachable end cap shown in FIG. 2A along LINE B-B.
Figure 3A:
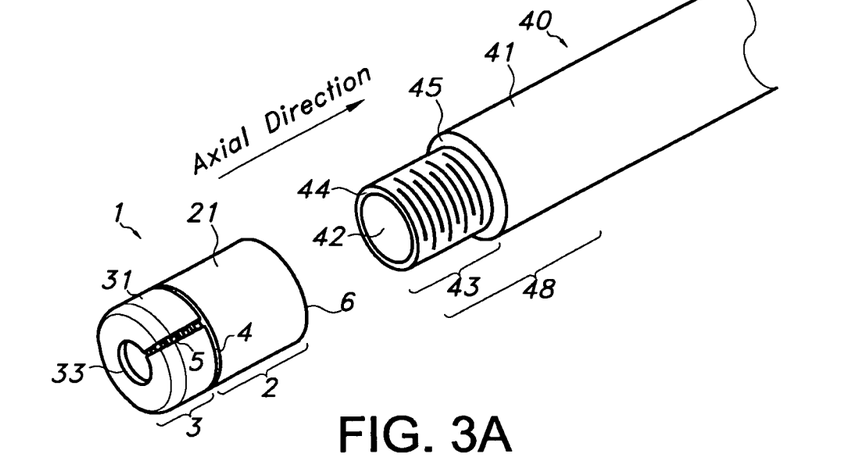
FIG. 3A depicts a conduit sleeve with detachable end cap to be installed on a threaded rigid conduit before installation.
Figure 3B:
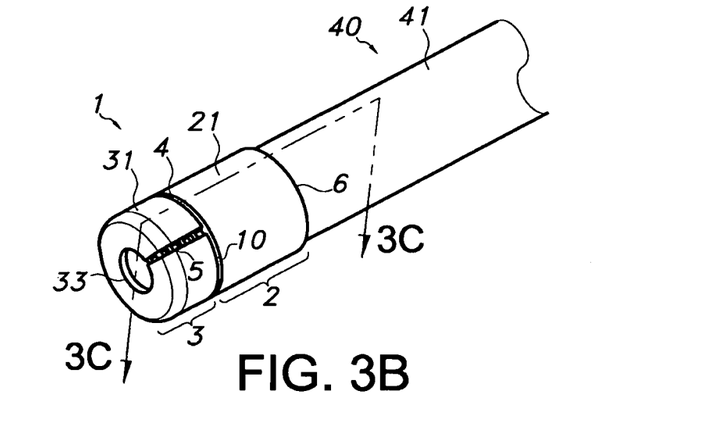
FIG. 3B depicts a conduit sleeve with detachable end cap installed on a threaded rigid conduit.

The exterior surfaces 21,31 of conduit sleeve with detachable end cap 1 may be smooth, as shown in FIG. 2A. Alternatively, one or both exterior surfaces 21,31 may be textured (not shown) or otherwise identifiable with a color or mark (not shown) in order to identify the size, type of conduit being capped, intended application of a receiving structure 50, etc. Also, one or both exterior surfaces 21,31 may have a raised or indented feature (not shown) to aid in gripping the conduit sleeve with detachable end cap 1 during installation. FIG. 2B shows a cross-sectional view cut along LINE B-B in FIG. 2A. As previous discussed, conduit port 23 is located at the conduit port end 6 of conduit sleeve with detachable end cap 1. Conduit port 23 provides entry into conduit void 24 within conduit sleeve portion 2, wherein the end 44 of a rigid conduit 40 may be inserted for protection during shipping, storage, or at a job site. Conduit void 24 is in communication with thread cover void 29 and separated by an internal shoulder (conduit end stopper 26). Conduit end stopper 26 forms an internal shoulder of the interior surface 22 within conduit sleeve portion 2, which thereby divides the interior void of the conduit sleeve with detachable end cap 1 into portions having different internal dimensions $d_1$ and $d_2$. Due to the step smaller of internal dimension $d_2$, conduit end stopper 26 provides a stop for the larger dimension of the non-threaded portion of a rigid conduit 40 at a conduit thread junction 45 (see FIG. 3A). Thread cover void 29 is comprised of the void within conduit sleeve with detachable end cap 1 from conduit end stopper 26 to thread end stopper 36. The thread end stopper 36 is a physical barrier/hard stop at the end cap end wall 3c, in which the end 44 of a rigid conduit 40 can reach no further. The threaded conduit end 44 may be further inserted into the thread cover void 29 for protection during shipping, storage, or at a job site. As can be seen in FIGS. 1D and 2B, the conduit sleeve with detachable end cap 1 has a plurality of wall dimensions (thickness) due to the step in internal dimensions $d_1$ and $d_2$ at conduit end stopper 26 and external recesses 4,5. The internal dimension ($d_1$ and $d_2$) step at conduit end stopper 26 also creates different dimensions for wall 2a and wall 2b. The internal dimension $d_1$ of conduit void 24 is designed to provide a friction fit between the interior surface 22 and the conduit exterior 41 by being slightly smaller than the external dimension of the rigid conduit 40 to be covered. In applications demanding a more rigorous hold, adhesives can also be applied to the interior surface 22 of the conduit sleeve portion 2 and/or the exterior surface 41 of the rigid conduit 40 to provide a more permanent positioning. The internal dimension $d_2$ of thread cover void 29 (reduced compared to the internal dimension $d_1$ of conduit void 24) is configured to conform to and create a tight frictional fit against the conduit threads 43 and provide structural support for end cap portion 3 in order to prevent accidental removal prior to a desired detachment time as conduit threads 43 will grip into the interior surfaces 22,32 of the end cap and conduit sleeve portions 3,2, respectively. The annular recess element 4 and annular seal surface 10 creates a sloping dimension for wall 4a. The thinning of the wall 4a dimension provides for a weakened portion of annular recess element for breaking end cap portion 3 away from conduit sleeve portion 2. The end cap recess element 5 is configured to have alternating thinned recess elements 8 and structural rib elements 9, which provides both convenient features for severing the end cap portion 3 for removal of end cap 30 (thinned recess elements 8) and features providing structural integrity to ensure the end cap 30 is not accidentally or haphazardly detached prior to the desired time (structural rib elements 9). The dimension of end cap portion wall 3a and end cap face wall 3c may be substantially the same as wall 2a or different to aid in identification of the detachable end cap portion 3.

Figure 3C:
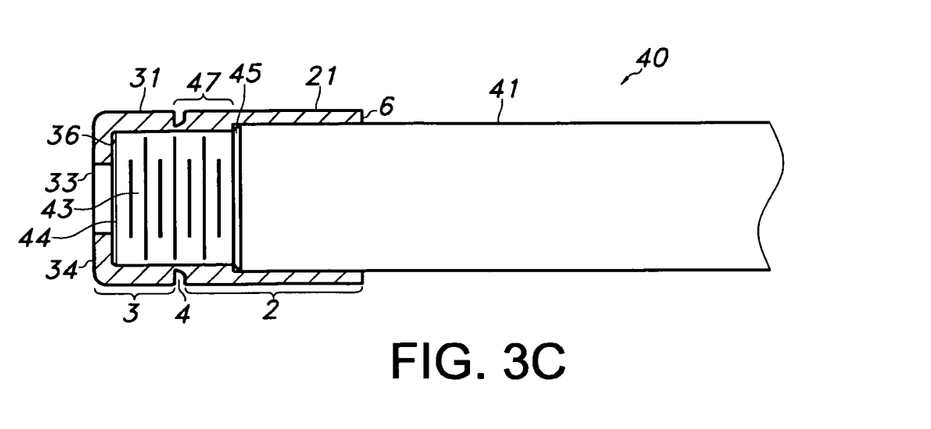
FIG. 3C is a cross-sectional view of the conduit sleeve with detachable end cap as it is installed on a threaded rigid conduit shown in FIG. 3B along LINE C-C.

A user may install a conduit sleeve with detachable end cap 1 on a rigid conduit 40, which may be coated (such as PVC) or uncoated, in order to provide protection during shipping, storage, at a job site, and/or for other purposes, such as conduit identification. A rigid conduit 40 may be made of any known electrically conductive material, such as aluminum or steel, which may be further galvanized, and may include a zinc coating as known in the art. The conduit sleeve with detachable end cap 1 is coupled with a rigid conduit 40 by inserting the conduit end 44 into the conduit port 23 at the conduit port end 6 of conduit sleeve with detachable end cap 1. The conduit end 44 will first enter into conduit void 24 within conduit sleeve portion 2. The internal dimension $d_1$ of conduit void 24 is designed to be larger than the outer dimension of the threaded conduit end 48, allowing this portion 48 to freely enter conduit void 24. When threaded conduit end 48 encounters thread cover void 29 at conduit end stopper (shoulder) 26, resistance to insertion will occur. This resistance is due to the smaller internal stepped dimension $d_2$ of thread cover void 29, which is designed to be a dimension that will conform to the dimension of the conduit threads 43, thereby creating a tight frictional fit against the conduit threads 43. Alternatively or in addition to the above cause, resistance to insertion will occur when the conduit thread junction 45 meets the conduit port 23. This resistance is due to the internal dimension $d_1$ of conduit void 24, which is designed to conform to the dimension of the conduit exterior surface 41, thereby creating a tight frictional fit against the conduit exterior surface 41. Therefore, a force may need to be exerted on the conduit sleeve with detachable end cap 1 in a longitudinal or axial direction of the rigid conduit 40 (see FIG. 3A) in order to complete the coupling. The coupling is complete when the conduit thread junction 45 meets the conduit end stopper 26. A tight fit is further effectuated by a beveled or sloped shape at the conduit thread junction 45 that creates a tight seal at the conduit end stopper 26. As can be appreciated in FIG. 3C, when the conduit thread junction 45 meets the conduit end stopper 26, the conduit sleeve portion 2 covers some of the conduit threads 43, while the remainder of the conduit threads 43 are covered by end cap portion 3. Preferably, conduit thread junction 45 encounters conduit end stopper 26 and little or no thread cover void 29 remains between conduit end 44 and thread end stopper 36.

Figure 4A:
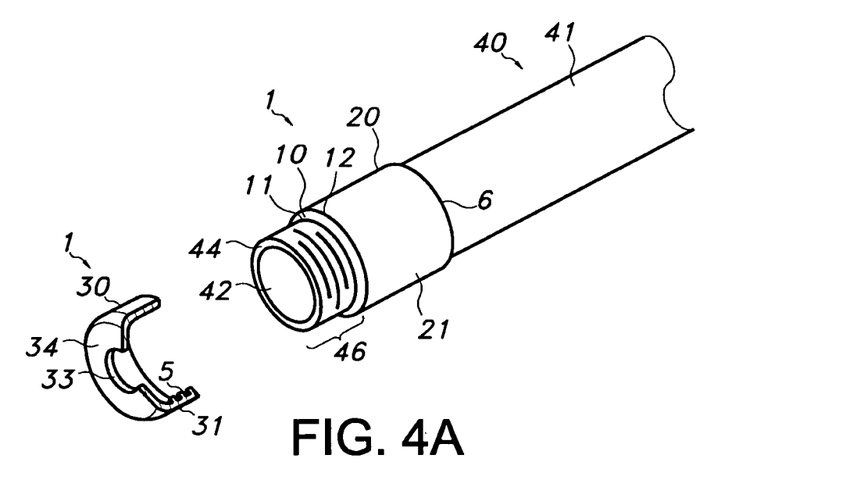
FIG. 4A depicts a conduit sleeve with detachable end cap installed on a threaded rigid conduit in which the detachable end cap has been cut along the cap recess element and peeled away to expose the conduit threads.
Figure 4B:
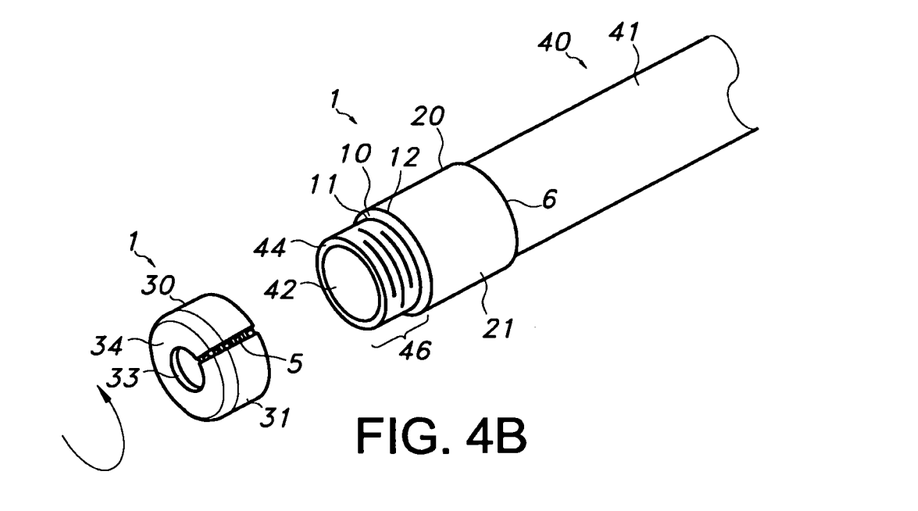
FIG. 4B depicts a conduit sleeve with detachable end cap installed on a threaded rigid conduit in which the detachable end cap has been twisted along the annular recess element and pulled away to expose the conduit threads.

Once the job site is ready for the end cap 30 to be detached from the conduit sleeve with detachable end cap 1, a user end cap 30 may be detached in a number of ways. For example, as shown in FIG. 4A, a user may cut along the end cap recess element 5 with a knife, razor blade, or other sharp instrument and peel off the end cap 30 from the conduit sleeve 20. The end cap window 33 can be used to better grip the end cap portion 3 when peeling. Alternatively or in addition to cutting along the end cap recess element 5, a user may also cut along the annular recess element 4 at the thinned end cap junction 11 with a knife, razor blade, or other sharp instrument and then pull off the end cap 30. As previously mentioned, the annular recess element 4 is mechanically weakened at the thinned end cap junction 11 to facilitate the end cap 30 breaking away from the conduit sleeve 20 while leaving annular recess seal 10. A user may therefore simply apply an axial traction force (twisting) on the end cap portion 3 to break away the end cap 30 from the conduit sleeve 20 while leaving annular recess seal 10 (see FIG. 4B). Furthermore, the end cap 30 is designed to break away from the remaining conduit sleeve 20 at a pre-determined distance from the conduit end 44. The pre-determined distance is designed to provide a length of exposed conduit threads 46 less than the maximum available distance within a receiving structure 50 threaded connector 54.

Figure 5A:
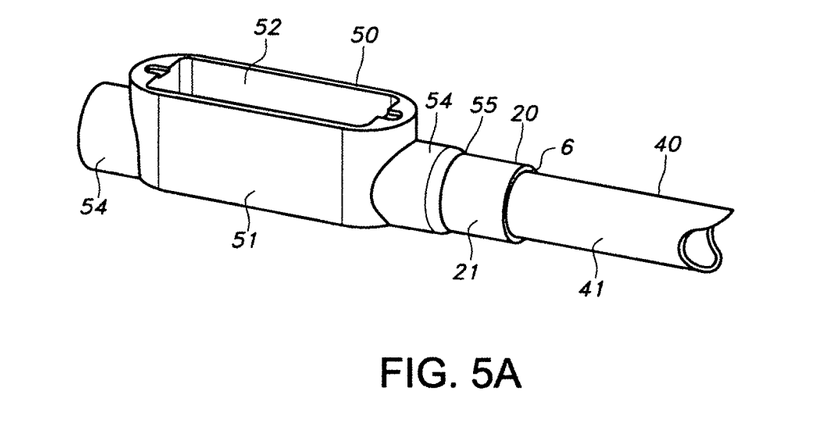
FIG. 5A depicts an exemplary installation application for the disclosed system showing a threaded rigid conduit with installed conduit sleeve threaded into a conduit body connector after removal of the detachable end cap.
Figure 5B:
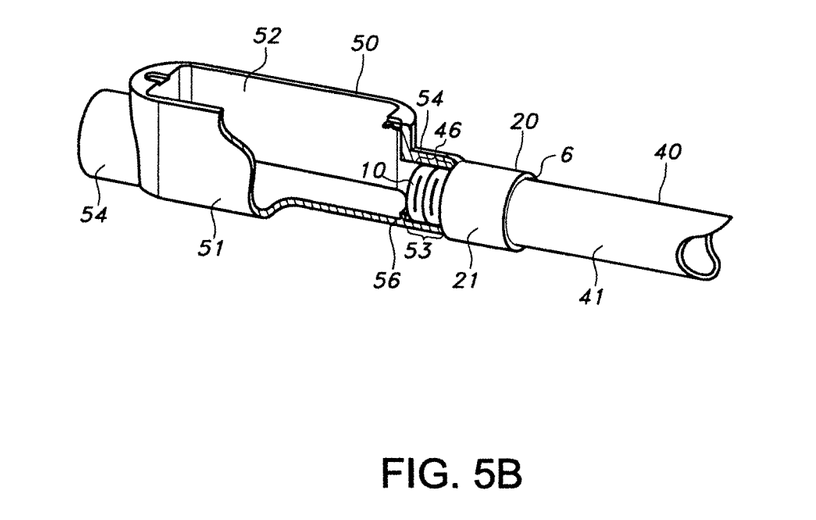
FIG. 5B is a partial cut-away view of the installation application shown in FIG. 5A showing a tight seal between the conduit body connector and the installed conduit sleeve annular recess element.

Now turning to FIGS. 5A and 5B, an application example is provided for a threaded rigid conduit 40 (in this case, coated with a non-conductive (electrically) material, such as PVC, but uncoated rigid conduit 40 and receiving structures 50 are fully contemplated to be within the scope and spirit of the system of the present invention) with installed conduit sleeve 20. The threaded rigid conduit 40 is coupled to the receiving structure 50. As shown, the receiving structure 50 of the disclosed system is a coated conduit body 50, but any receiving structure 50 known in the art, including without limitation conduit bodies, fixtures, fittings, connectors, etc. are fully contemplated to be within the scope and spirit of the system of the present invention. Furthermore, the receiving structure 50 has an interior surface 52 and an exterior surface 51, which may be coated with a non-conductive (electrically) material, such as PVC, or uncoated. The receiving structure 50 has at least one connector opening 54 for coupling to a rigid conduit 40. While rigid conduit 40 is shown as threaded, the conduit sleeve with detachable end cap 1 can be used on non-threaded rigid conduit 40, as well. As shown, connector opening 54 has connector threads 53 for coupling to a threaded rigid conduit 40.

As shown in FIGS. 5A and 5B, threaded rigid conduit 40 is coupled to a coated conduit body 50 by threading into the threaded connector 54. The exposed conduit threads 46 are matched to corresponding connector threads 53. As discussed above, conduit sleeve 20 covers a predetermined length or distance of conduit threads 43 such that the length or distance of exposed conduit threads 46 after detaching end cap 30 is shorter than the distance from the connector edge 55 to connector thread end stopper 56. In other words, the end cap 30 is designed to break away at a predetermined distance from the threaded conduit end 48 for the conduit sleeve 20 to best seal against the conduit body 50 as the connector edge 55 encountering the annular sealing surface 10 prevents threaded conduit end 44 from encountering connector thread end stopper 56. The rising beveled shape of annular sealing surface 10 creates a tight seal between conduit sleeve 20 and the conduit body connector edge 55 as the connector edge 55 is encouraged to ride up the beveled shape to a blunt end at conduit sleeve junction point 12 of conduit sleeve 20. A particularly advantageous aspect of the disclosed invention is that the resulting seal between connector edge 55 and the blunt end at conduit sleeve junction point 12 protects uncoated conduit threads 43 from corrosion after coupling with a receiving structure 50.

The conduit sleeve with detachable end cap 1 of the present invention can made using any known manufacturing process known in the art. However, molding processes are preferred. The conduit sleeve with detachable end cap 1 of the present invention can made from any non-conductive (electrically) plastic or rubber (natural or synthetic) material. Preferably, the conduit sleeve with detachable end cap 1 of the present invention is made from a resilient, elastomeric material. A resilient material with elastomeric properties allows for the conduit sleeve with detachable end cap 1 of the present invention to conform to the target conduit 40 is misshapen (e.g., bent) or otherwise is not of a regular shape. Although preferred embodiments of the conduit sleeve with detachable end cap 1 of the present invention are of a generally round shape to correspond with typical coated and uncoated rigid conduit systems, it should be understood that the present invention can be configured in any shape to protect the end of a tubular structure, whether threaded or unthreaded. Most coated conduit systems are typically sold in 12 trade sizes including sizes ½, ¾, 1, 1¼, 1½, 2, 2½, 3, 3½, 4, 5, and 6 (conduit diameter in inches). The conduit sleeve with detachable end cap 1 of the present invention can be configured to fit all of these sizes. However, it should be understood that the invention can also be provided in any conceivable size of conduit 40 as desired. The conduit sleeve with detachable end cap 1 of the present invention can also be configured to provide identifying marks, textures, or have colors/patterns signifying a particular size of conduit 40, a particular type of conduit 40, the intended application for a particular conduit 40, and/or other desirable demarcations. The conduit sleeve with detachable end cap 1 of the present invention can also be provided in a variety of textures on one or more external surface 21, 31 to aid in gripping and installation of the conduit sleeve with detachable end cap 1 of the present invention onto a rigid conduit 40. Thus, it should be understood that the conduit sleeve with detachable end cap 1 of the present invention simplifies the existing complex rigid conduit systems, especially coated conduit systems, which require specialty coated receiving structures 50 (such as conduit bodies, fixtures, fittings, connectors, rigid conduits with female threading, etc.) by providing a single device for capping the end of the conduit and a sleeve to create a seal at the receiving structure 50.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A conduit sleeve device comprising:
   a conduit sleeve portion having an exterior surface, an interior surface, and a conduit port;
   an end cap portion having an exterior surface, an interior surface, an end cap window, and an end cap face surface, the end cap portion and the conduit sleeve portion being coupled together to form a monolithic body; and
   an annular recess element disposed in the monolithic body between the exterior surface of the conduit sleeve portion and the exterior surface of the end cap portion, the annular recess element sized to accommodate selective detachment of the end cap portion from the monolithic body, and
   wherein the end cap portion further includes an end cap recess element disposed on the exterior surface of the end cap portion and the end cap face surface.

2. The device of claim 1, further comprising a conduit void having a first internal dimension and conduit thread void having a second internal dimension.

3. The device of claim 2, wherein the second internal dimension is smaller than the first internal dimension.

4. The device of claim 2, wherein the junction of the second internal dimension and the first internal dimension forms an internal shoulder.

5. The device of claim 2, wherein the end cap recess element includes alternating thinned recess elements and structural rib elements.

6. The device of claim 2, wherein the annular recess element is defined in part by a beveled annular seal surface in an exterior surface of the device between the conduit sleeve portion and the end cap portion, the beveled annular seal surface having an end cap portion junction and a conduit sleeve junction point, the end cap portion junction adjoining the end cap portion and the conduit sleeve junction point, the beveled annular seal surface having a first wall thickness at the end cap portion junction between the exterior surface of the beveled annular seal surface and the interior surface of the end cap portion and second wall thickness at the conduit sleeve junction point between the exterior surface of the beveled annular seal surface and the interior surface of the end cap portion, the first wall thickness being less than the second wall thickness.

7. The device of claim 6, wherein, when the device is installed onto a threaded rigid conduit having a threaded conduit end and the end cap portion is detached, the conduit sleeve portion and annular recess element are configured to cover a first portion of conduit threads of the threaded rigid conduit and to expose a second portion of conduit threads of the threaded rigid conduit at the threaded conduit end, wherein the second portion of conduit threads includes a length of conduit threads that is a pre-determined distance from the threaded conduit end.

8. A conduit sleeve and end cap device comprising:
a monolithic body having an end cap portion and a conduit sleeve portion, the monolithic body extending between a conduit port and a thread end stopper, the monolithic body comprising:
a conduit void having a first internal dimension;
a thread cover void having a second internal dimension, the second internal dimension being smaller than the first internal dimension;
a conduit end stopper at the junction of the conduit void and the thread cover void;
an annular recess element along a portion of an exterior surface of the monolithic body between the end cap portion and the conduit sleeve portion, the annular recess element sized to accommodate selective detachment of the end cap portion from the monolithic body; and
an end cap recess element disposed on the exterior surface and an end cap face surface of the end cap portion of the monolithic body.

9. The device of claim 8, wherein the conduit port is configured to receive a threaded conduit end of a threaded rigid conduit such that a threaded conduit end fits tightly in the thread cover void and a rigid conduit exterior surface fits tightly in the conduit void.

10. The device of claim 9, wherein the thread cover void is comprised of a conduit sleeve thread cover void and a conduit thread protection void.

11. The device of claim 10, wherein the annular recess element is sized and positioned to reduce a wall thickness between the exterior surface and an interior surface of the monolithic body.

12. The device of claim 11, wherein the conduit sleeve thread cover void is configured to cover a first portion of conduit threads of the threaded rigid conduit after the end cap portion is detached.

13. The device of claim 11, wherein the conduit thread protection void is configured to expose a second portion of conduit threads of the threaded rigid conduit after the end cap portion is detached, wherein the second portion of conduit threads includes a length of conduit threads that is a pre-determined distance from the threaded conduit end.

14. The device of claim 11, further comprising the threaded rigid conduit installed in the device and the cap portion is detached.

15. A system for protecting an open end and a portion of threads of a threaded rigid conduit comprising:
at least one rigid conduit;
at least one receiving structure;
and at least one conduit sleeve device of claim 1.

16. The system of claim 15, wherein the at least one rigid conduit and the at least one receiving structure is coated with PVC.

17. The system of claim 15, wherein the at least one receiving structure is selected from the group consisting of a conduit body, fixtures, fittings, connectors, and rigid conduits with female threading.

18. The system of claim 16, wherein the at least one conduit sleeve device is installed on the at least one rigid conduit, the end cap is detached, and the at least one rigid conduit is coupled with the at least one receiving structure.

* * * * *